United States Patent
Patel et al.

(10) Patent No.: US 11,422,935 B2
(45) Date of Patent: Aug. 23, 2022

(54) DIRECT MAPPING MODE FOR ASSOCIATIVE CACHE

(71) Applicant: Advanced Micro Devices, Inc., Santa Clara, CA (US)

(72) Inventors: Chintan S. Patel, Austin, TX (US); Vydhyanathan Kalyanasundharam, Santa Clara, CA (US); Benjamin Tsien, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/033,287

(22) Filed: Sep. 25, 2020

(65) Prior Publication Data

US 2021/0406177 A1 Dec. 30, 2021

Related U.S. Application Data

(60) Provisional application No. 63/044,735, filed on Jun. 26, 2020.

(51) Int. Cl.
*G06F 12/0817* (2016.01)

(52) U.S. Cl.
CPC .... *G06F 12/082* (2013.01); *G06F 2212/6082* (2013.01)

(58) Field of Classification Search
CPC .............. G06F 12/082; G06F 2212/6082
See application file for complete search history.

(56) References Cited

U.S. PATENT DOCUMENTS

| | | | | |
|---|---|---|---|---|
| 6,009,503 A | * | 12/1999 | Liedtke | G06F 12/1054 711/200 |
| 2007/0079064 A1 | * | 4/2007 | Kobayashi | G06F 12/0873 711/113 |
| 2013/0275680 A1 | * | 10/2013 | Ikegaya | G06F 3/0644 711/118 |
| 2016/0041776 A1 | * | 2/2016 | Inoue | G06F 3/0689 711/114 |

* cited by examiner

*Primary Examiner* — Sean D Rossiter
(74) *Attorney, Agent, or Firm* — Volpe Koenig

(57) ABSTRACT

A method of controlling a cache is disclosed. The method comprises receiving a request to allocate a portion of memory to store data. The method also comprises directly mapping a portion of memory to an assigned contiguous portion of the cache memory when the request to allocate a portion of memory to store the data includes a cache residency request that the data continuously resides in cache memory. The method also comprises mapping the portion of memory to the cache memory using associative mapping when the request to allocate a portion of memory to store the data does not include a cache residency request that data continuously resides in the cache memory.

19 Claims, 5 Drawing Sheets

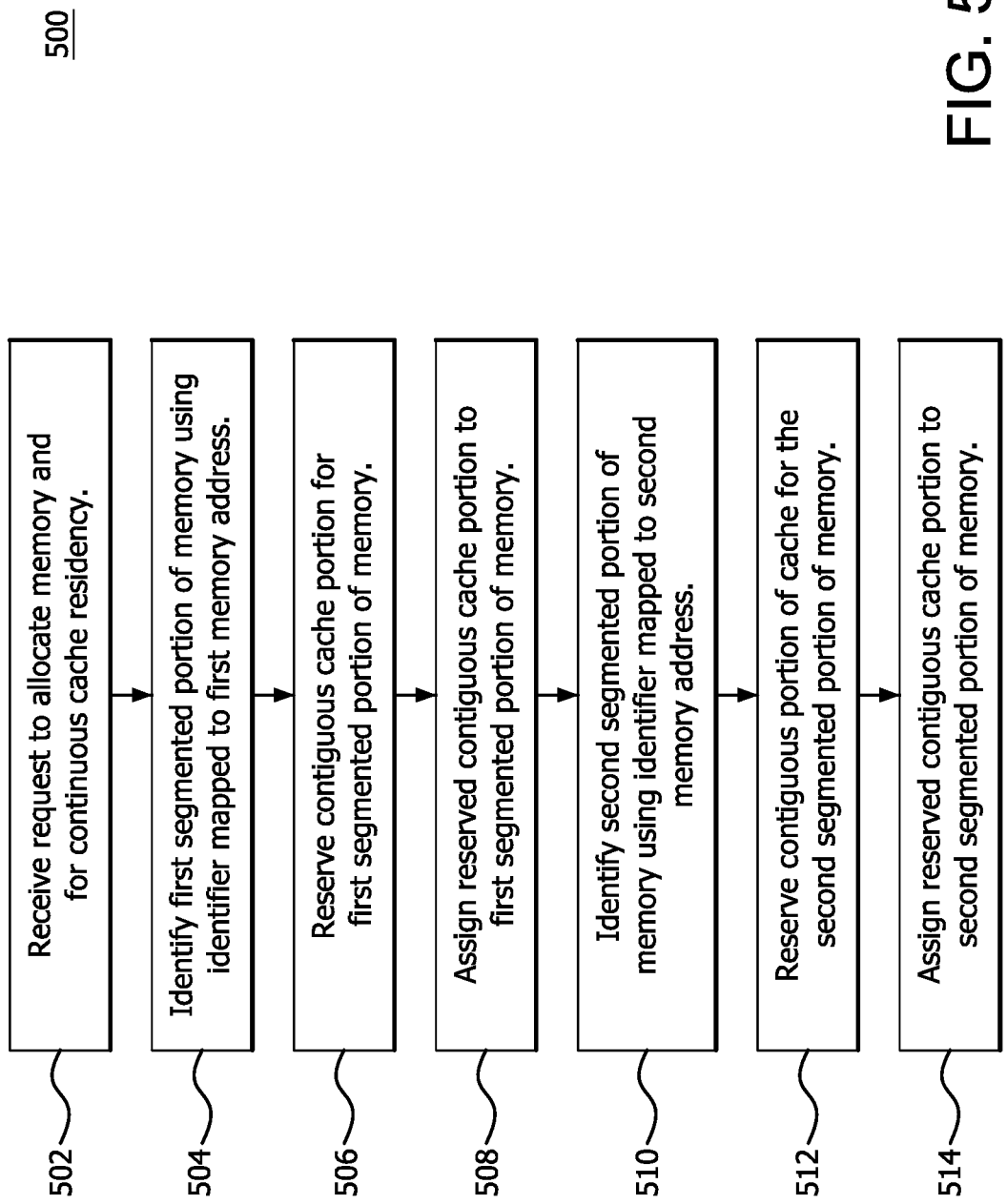

DIRECT MAPPING MODE FOR ASSOCIATIVE CACHE

CROSS-REFERENCE TO RELATED APPLICATIONS

This application claims the benefit of U.S. Provisional application No. 63/044,735, entitled "DIRECT MAPPING MODE FOR ASSOCIATIVE CACHE," filed on Jun. 26, 2020, the entirety of which is hereby incorporated herein by reference.

BACKGROUND

Cache memory (hereinafter "cache"), is used to accelerate access to data stored in a larger memory portion (e.g., main memory) by storing copies of data in the cache that are frequently accessed in larger memory portion. When a processor requests access (e.g., read data from or write data to) to the larger memory portion (e.g., identified by an address), the processor first determines whether a copy of the data is stored in the cache. If it is determined that a copy of the data is stored in the cache, the processor accesses the cache, facilitating a more efficient accessing of the data.

Frequently accessed data is copied from the memory to the cache in blocks of fixed size, typically referred to as cache lines. When a cache line is copied to the cache, a cache entry is created (i.e., placed in the cache), which includes the copied data and the requested memory address (e.g., a tag). If the tag is located in the cache, a cache hit occurs and the data is accessed in the cache line. If the tag is not in the cache, a cache miss occurs. A new entry is allocated to the cache, data from the larger memory is copied to the cache and the data is accessed. Existing entries may be replaced (e.g., evicted) by new entries according to different mapping policies, which include direct mapping and associative mapping.

BRIEF DESCRIPTION OF THE DRAWINGS

A more detailed understanding can be had from the following description, given by way of example in conjunction with the accompanying drawings wherein:

FIG. 5 is a flow diagram illustrating an example method of directly mapping identified portions of memory to a cache according to features of the present disclosure.

DETAILED DESCRIPTION

Figure 1:
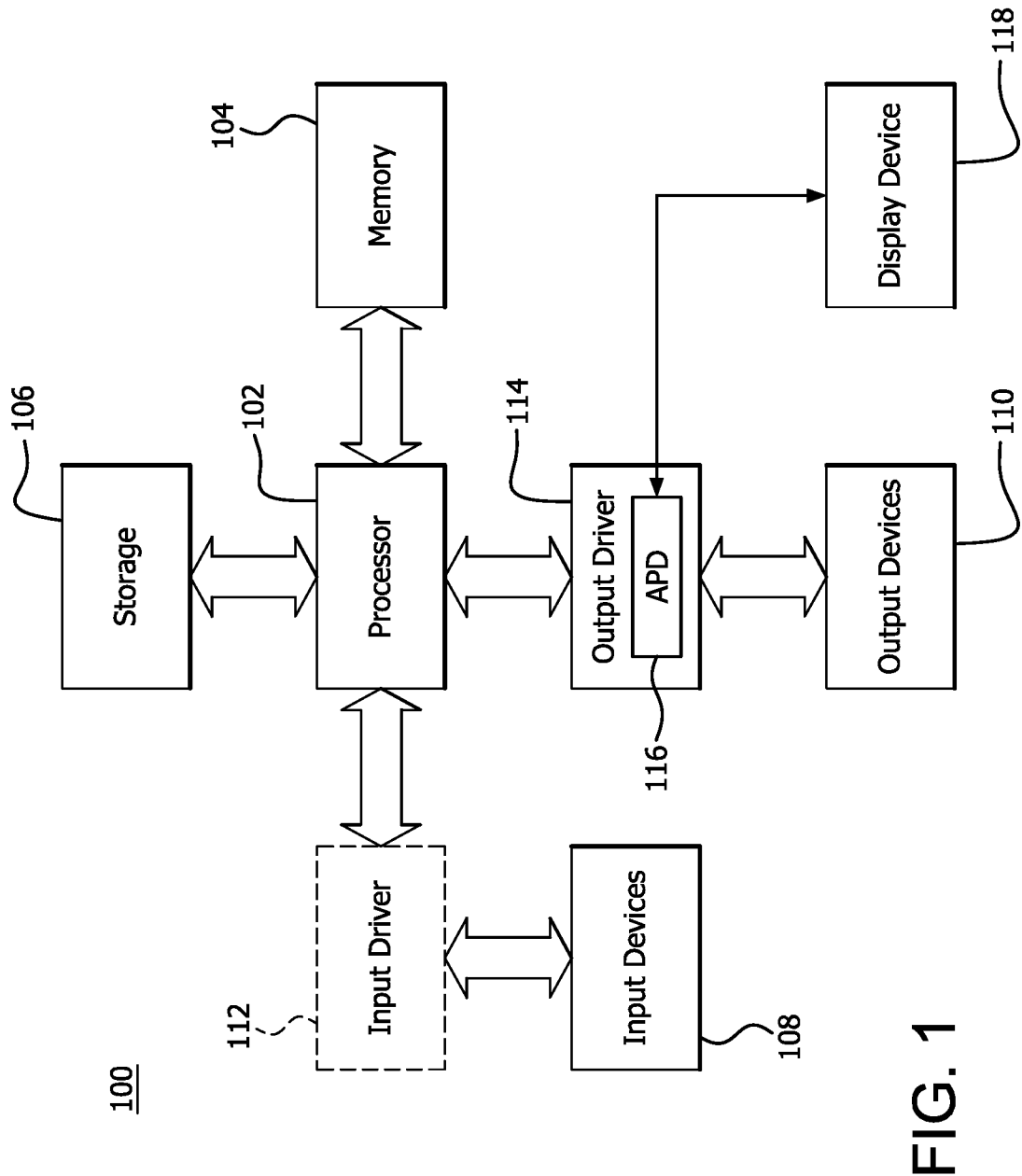
FIG. 1 is a block diagram of an example device in which one or more features of the disclosure can be implemented.

When a direct mapping policy is used, each memory address is allocated to a particular location (e.g., index) in the cache. The mapping between memory and the cache is easy implemented because indices and offsets can be easily computed (e.g., with bit operators or simple arithmetic) and less power is consumed to place data in the cache because searching through many cache lines is avoided. Cache lines of a direct mapped cache can be repeatedly evicted, however, when many addresses are mapped to the same cache indices, despite the existence of unused cache lines.

When a fully associative mapping policy is used, new entries can be copied to any cache address. For fully associative caches, there are no conflicts (i.e., no cache miss from conflict) between multiple memory addresses which map to a single cache block because the data can be placed in any unused cache line. Fully associative caches are very expensive to implement, however, because the entire address is used as the tag, which greatly increases the cache size over a direct mapped cache. In addition, the tags of each cache block in the cache must be checked because the data can be located at any cache line, which increases the power consumption and latency. Accordingly, while associative caches have lower cache miss rates than direct mapped caches, they have increased hardware costs, power consumption and latency than direct mapped caches.

For these reasons, conventional associative caches typically utilize an N-way set associative mapping policy in which each entry is allocated to a set containing N number of cache lines, where each line can hold the data from any tag. For set associative caches, the larger the N number of lines in an N-way set associative policy, the greater the associativity and the lower probability for cache misses. The increase in associativity, however, includes an increase in the N number of lines and a greater number of addresses to search, resulting in increased latency, more power consumption and a larger storage area.

Generally, as caches move closer to main memory, the caches are implemented as physical memory address tagged caches (i.e., physically tagged caches. Physically tagged caches are accessed using a physical address and after the virtual to physical translation is performed.

During power-saving periods of operation (e.g., low power mode or a power management activity period), programs which do not use one or more components (e.g., DRAM) are typically executed such that these components can be taken off-line. But in some instances, clients (e.g., high service clients, such as a display client) execute programs which continually fetch data in order to perform their function during these power-saving periods of operation. Because components, such as DRAM or other memory portions (e.g., other non-physically tagged caches) are off-line to conserve power, a physically tagged cache is used to execute the programs which continually fetch data.

It is difficult, however, to allocate a physically contiguous large portion of memory for a virtually contiguous large address. For example, when a client requests a portion of memory to be allocated, a contiguous portion of virtual memory (e.g., of size frame buffer), having a start address and end address, is allocated. However, when the portion of physical memory (e.g., main memory) that maps to the contiguous portion of virtual memory is not contiguous (segmented in physical memory), translations between the virtual memory and the physical memory addresses can result in non-contiguous physical memory addresses. When the non-contiguous physical memory addresses alias on top of each other (e.g., map to same indices) in a physically tagged associative cache, data is evicted, regardless of the existence of unused (e.g., empty) or less frequently used cache lines.

When a requested portion of memory (e.g., 8 KB) is less than a cache size (e.g., 1 MB), it is physically feasible for each portion of the data used to execute the program to be present in the cache throughout execution of the program without any of the data being evicted from the cache. But, as described above, when the non-contiguous physical memory addresses alias to the same indices of a physically tagged cache, conventional set associative policies cause data to be evicted from the cache, even when unused or less frequently used cache lines are available.

The present application provides apparatuses and methods for determining whether a request, from a client (e.g., a display client) for memory allocation to store data, also includes a request that each portion of the data to be stored in the requested portion of memory continuously resides in (i.e., is not evicted from) the cache. The request is, for example, a request for the data to continuously reside in the cache for a period of time, for a number of cycles or until an occurrence of an event (e.g., a program or a portion of a program completes execution, the client indicates that data no longer needs to reside in the cache or the processing device exits a power saving mode). Based on the determination of a request for continuous cache residency, the cache is dynamically controlled to switch between a mode in which the cache is associatively mapped and a mode in which a portion of the cache is directly mapped and another portion of the cache is associatively mapped. For example, a physically constructed associative cache is dynamically used in a direct mapping mode. Accordingly, both associative and direct mapping can be implemented to execute a program/application depending on a dynamically determined particular use case (e.g., a request that data continually reside in the cache).

For example, when a request from a client for a portion of memory to be allocated also includes a request for the data to continuously reside in the cache, different non-contiguous portions of the requested memory are identified and directly mapped to assigned indices in the cache. Accordingly, data corresponding to the non-contiguous portions of the requested memory is not evicted and remains in the cache for a period of time, for a number of cycles, or until the occurrence of an event. Otherwise, the addresses of requested memory are mapped to the cache using associative mapping.

Features of the present disclosure are useful for instances in which multiple clients, which do not share the same virtual to physical translation information or do not share the same virtual addresses, are trying to use the same physically tagged cache.

A method of controlling a cache is disclosed. The method comprises receiving a request to allocate a portion of memory to store data. The method also comprises directly mapping a portion of memory to an assigned contiguous portion of the cache memory when the request to allocate a portion of memory to store the data includes a cache residency request that the data continuously resides in cache memory. The method also comprises mapping the portion of memory to the cache memory using associative mapping when the request to allocate a portion of memory to store the data does not include a cache residency request that data continuously resides in the cache memory.

A method of controlling a cache is disclosed. The method comprises receiving a request to allocate a portion of memory to store data and for continuous residency of the data in cache memory and identifying a first segment of the portion of memory using a first identifier mapped to a first memory address. The method also comprises reserving a first contiguous portion of the cache memory for the first identified segment of memory and assigning the first contiguous portion of the cache memory to the first segmented portion of memory. The method further comprises identifying a second segment of the portion of memory using a second identifier mapped to a second memory address that is non-contiguous with the first memory address, reserving a second contiguous portion of the cache memory for the second identified segment of memory and assigning the second contiguous portion of the cache memory to the second segmented portion of memory.

A processing device is disclosed which comprises memory, a cache memory portion, separate from the memory and a processor. The processor is configured to receive a request to allocate a portion of the memory to store data, when the request to allocate a portion of memory to store the data includes a cache residency request that the data continuously resides in cache memory, directly map the portion of memory to an assigned contiguous portion of the cache memory and when the request to allocate a portion of memory to store the data does not include a cache residency request that data continuously resides in the cache memory, map the portion of memory to the cache memory using associative mapping.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
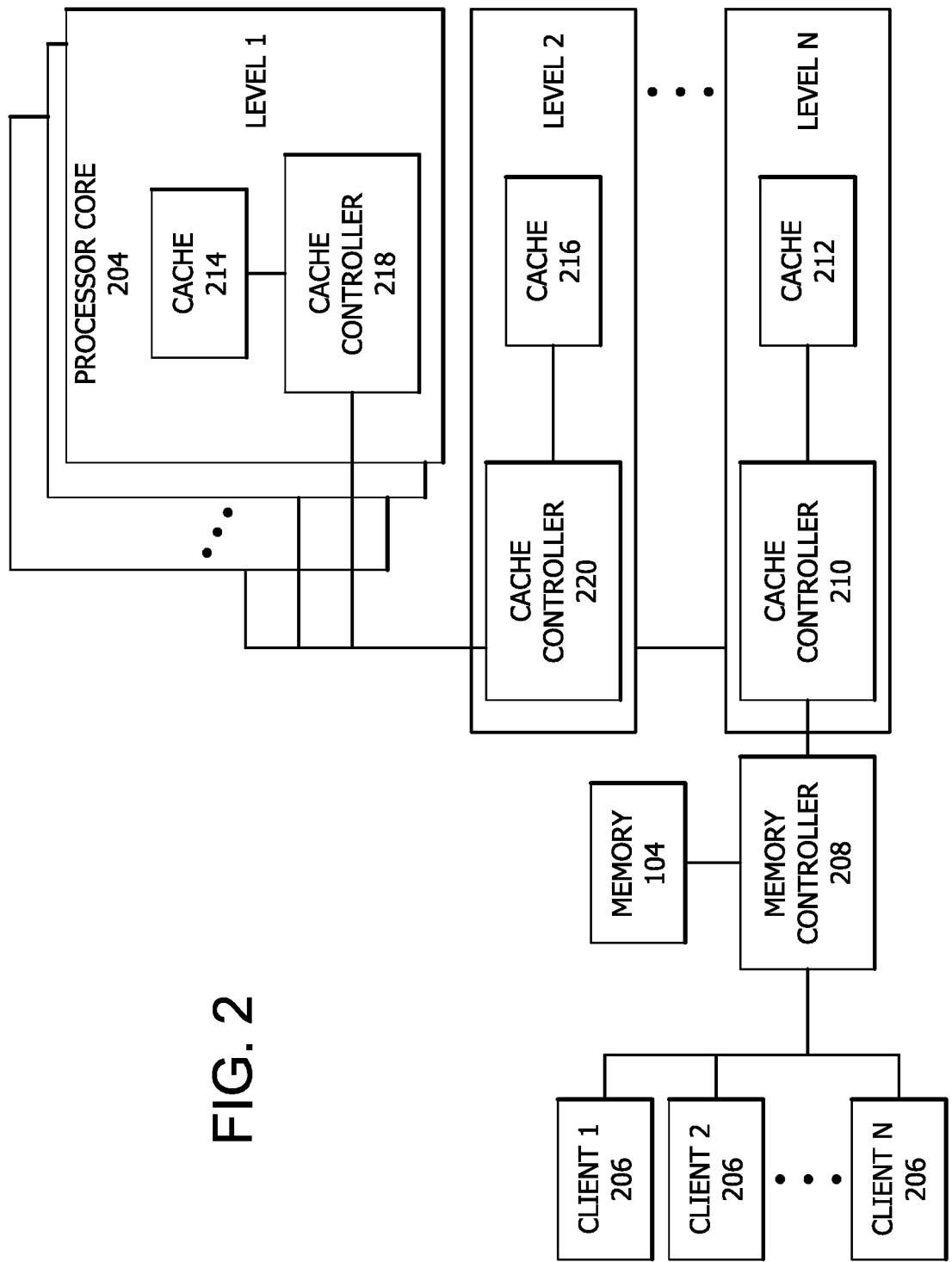
FIG. 2 is a block diagram illustrating example components for implementing one or more features of the disclosure.

FIG. 2 is a block diagram illustrating example components for implementing one or more features of the disclosure. Some components shown in FIG. 2 are, for example, components of a processor, such as an accelerated processor (e.g., GPU). Features of the disclosure can be executed by one or more processors of a first type, such as a CPU, and/or one or more processors of a second type, such as a GPU.

Features of the disclosure can be implemented using caches on any of a plurality of levels. For example, as shown in FIG. 2, components include a plurality of processor cores 204. Each core 204 includes a corresponding level 1 cache controller 218 in communication with a corresponding level 1 cache 214 and configured to process data using the corresponding level 1 cache 214.

As further shown in FIG. 2, components also includes a level 2 cache controller 220/processor in communication with level 2 cache 216 and configured to process data using level 2 cache 216. Cache controller/processor 220 is also in communication with a next cache level (higher cache level). Any number of N level caches can be used. The next level cache, such as N level cache 212 (e.g., last level cache) and N level cache controller 210 can be in communication with and shared by caches of multiple processors, such as for example, caches of a CPU or GPU (not shown), which may be located on the same die, or multiple dies.

Memory controller/processor 208 is in communication with memory 104 (e.g., DRAM) and cache controllers 220 and 218. As shown in FIG. 2, multiple clients 206 are in communication with memory controller 208. When a client 206 requests a portion of memory to be allocated, memory controller 208 is configured to receive and service requests, from client 206 (e.g., display client) and access cache 216 via cache controller 220 and cache 214 via cache controller 218. Memory controller/processor 208 is configured to receive requests from clients 206, allocate memory, control access to one or more caches (e.g., last level cache 212) and various other functions described herein. For example, memory controller/processor 208 is configured to control cache access by one or more clients 206 in an associative mapping mode and control access to the same cache by one or more clients in a direct mapping mode.

For simplified explanation purposes, FIG. 2 shows a single client 206. Memory controller is configured, however, to receive requests from any number of clients. A client can share the same virtual to physical translation information with one or more other clients or include their own virtual to physical translation information. Each client can have the same virtual address as one or more other clients or include a different virtual address.

Generally, as caches move closer to memory 104, the caches are implemented as physical memory address tagged caches (i.e., physically tagged caches. Feature of the present disclosure are suitable for instances in which multiple clients are trying to utilize the same physically tagged cache and the clients do not share the same virtual to physical translation information and do not share the same virtual address.

Examples of implementing features of the present disclosure, including dynamically accessing a cache in different cache modes, are now described with reference to FIGS. 3, 4A, 4B and 5.

For simplified explanation purposes, the examples described below include requests from a single client (i.e., a display client). Features of the present disclosure can also be implemented, however, by multiple different clients accessing the same cache. For example, features of the present disclosure can be implemented when one or more clients accessing the cache in an associative mapping mode and one or more clients are accessing the cache in a direct mapping mode.

For simplified explanation purposes, the examples are described using a cache having a size of 1 MB, 64 K cache lines and 16 K indices. The cache size and number of indices described with regard to the method 300 is merely an example. Features of the present disclosure can be implemented using caches having different sizes and different numbers of indices and can be implemented for different amounts of requested non-contiguous memory.

For simplified explanation purposes, the examples described herein include assigning cache indices for data corresponding to the identified first portion of memory. Features of the present disclosure also include assigning a number of ways per cache index. For example, in a 16 way cache (i.e., 16 ways per cache set), if a 25% portion of the cache is allocated for direct mapping mode, 4 ways per index is assigned. Accordingly, in this example, a portion of each index (i.e., less than the whole index) is assigned unless, for example, a larger portion (e.g., $15/16$) of the cache is allocated for direct mapping mode.

Figure 3:
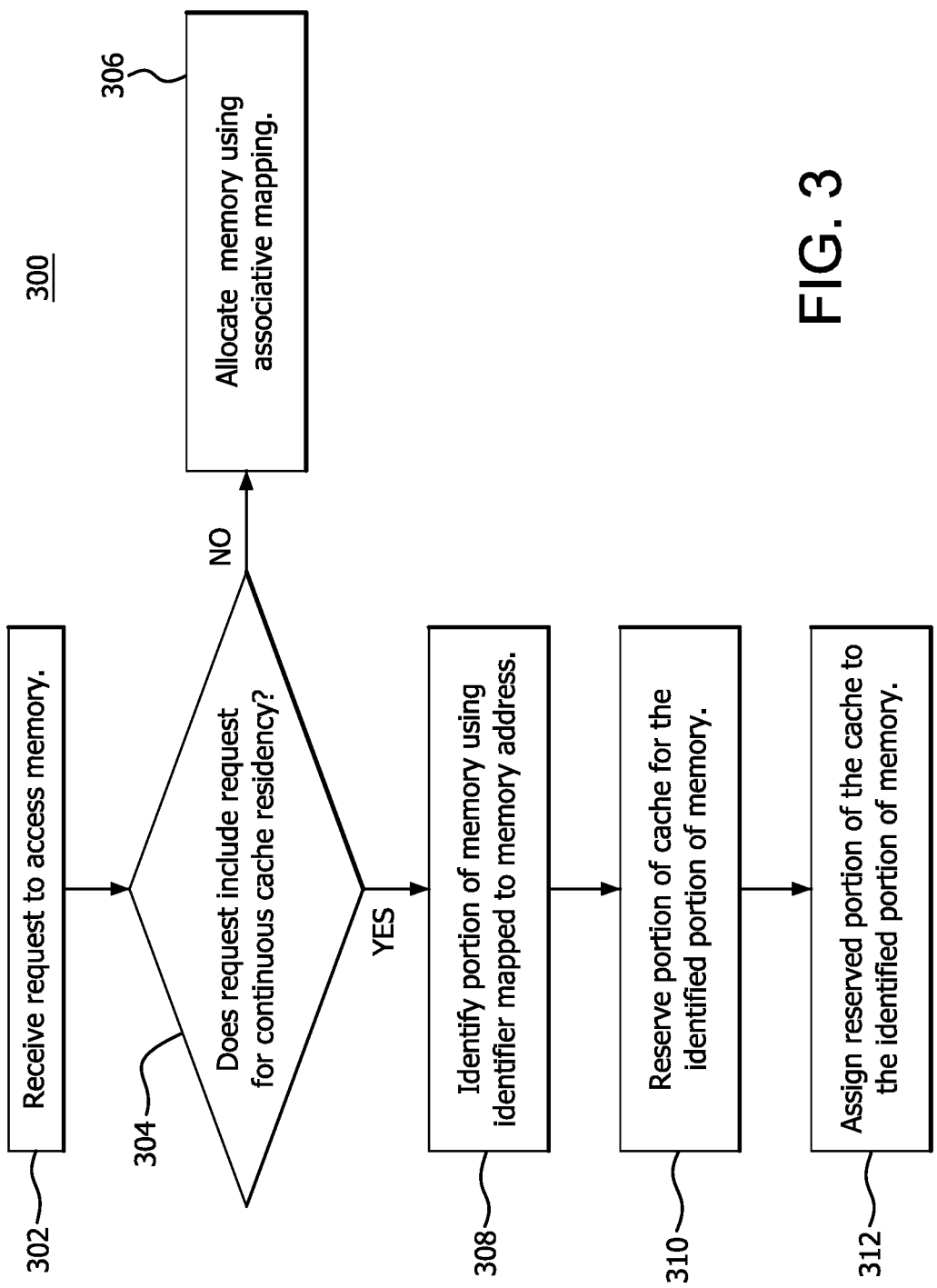
FIG. 3 is a flow diagram illustrating an example method of dynamically switching between different cache modes according to features of the present disclosure.
Figure 4B:
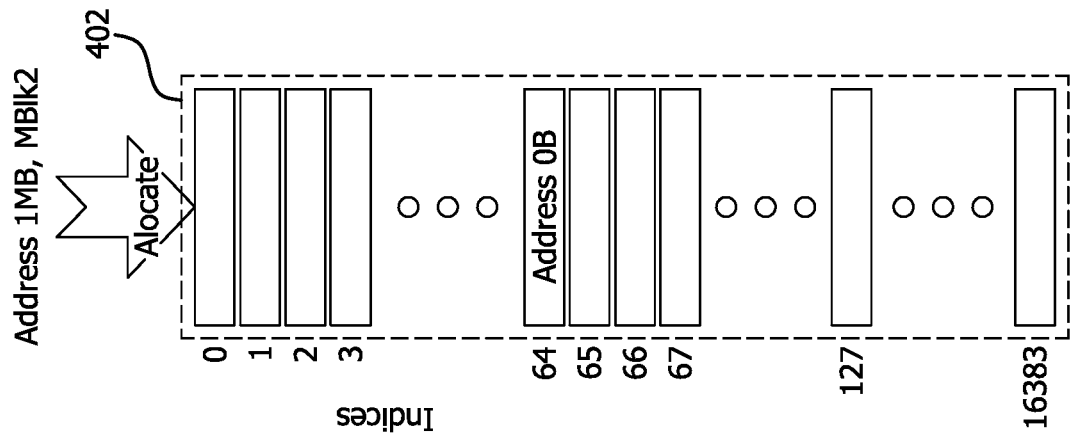
FIG. 4B is a diagram illustrating an example of directly mapping non-contiguous memory portions to predetermined cache indices of a cache according to features of the present disclosure.
Figure 4A:
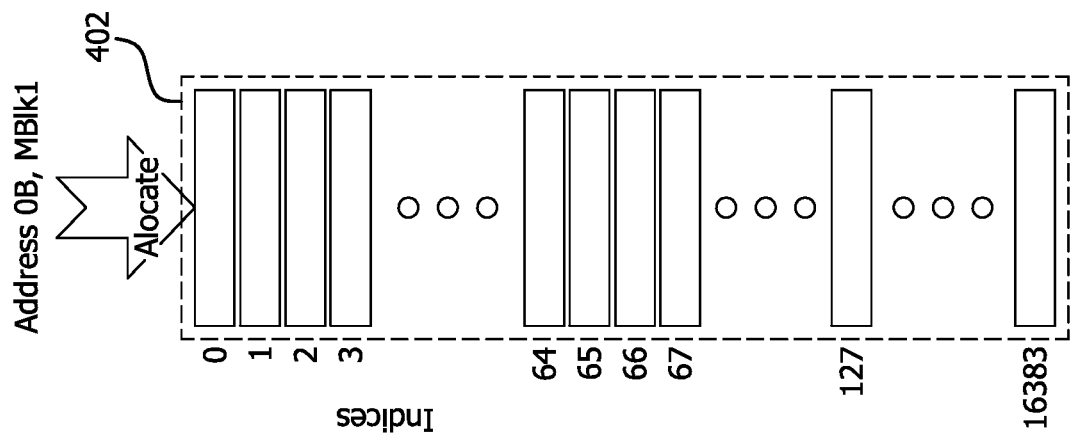
FIG. 4A is a diagram illustrating the mapping of different memory addresses to identified blocks of memory according to features of the present disclosure.
Figure 4A:
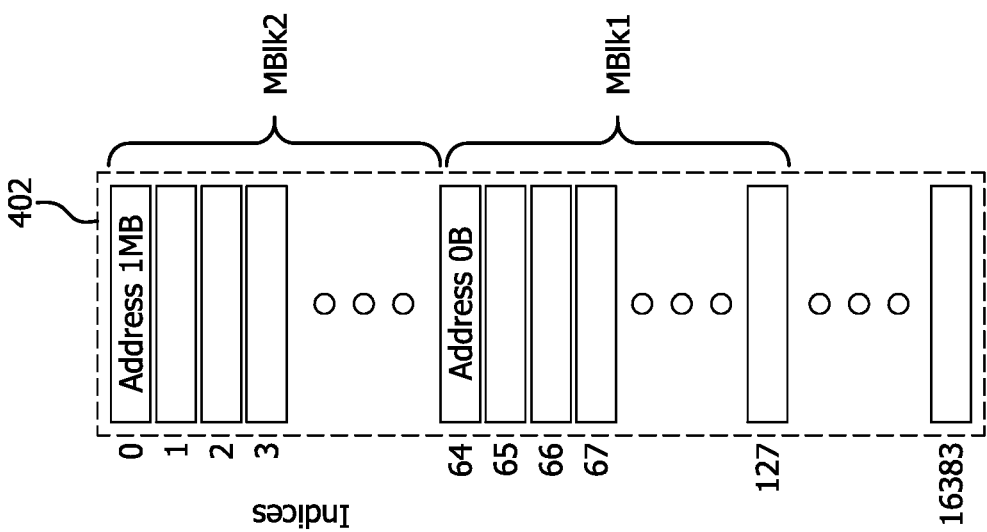

FIG. 3 is a flow diagram illustrating an example method 300 of dynamically switching between different cache modes according to features of the present disclosure. FIG. 4A is a diagram illustrating the mapping of different memory addresses to identified blocks of memory. FIG. 4B is a diagram illustrating an example of directly mapping non-contiguous memory portions to predetermined cache indices of a cache 402.

As shown at block 302, the method 300 includes receiving a request to allocate a portion (e.g., a block) of memory to store data. In some cases, the request also includes a request for continuous cache residency of the data to be stored to the portion of memory. For example, a request is received, from a display client, to allocate a 4 KB block of memory and that the data, to be stored in the 4 KB block of memory, reside in the cache (i.e., not be evicted) for a period of time, for a number of cycles, or until the occurrence of an event (e.g., a program or a portion of a program completes execution, the client indicates that data no longer needs to reside in the cache, the processing device exits a power saving mode, or the occurrence of another event).

As shown at block 304, the method 300 includes determining whether the request includes the request for continuous cache residency of the data corresponding to the portion of memory. When it is determined, at block 304, that the request does not include a request for continuous cache residency, the memory is allocated to the cache 402 using associative mapping, at block 306.

When it is determined, at block 304, that the request does include the request for continuous cache residency, the portion of memory is identified using an identifier which is mapped to the address for the portion of memory, at block 308. For example, the display client accesses mapping translation information (e.g., a translation table) which maps memory addresses to blocks of memory each identified by a block identifier. The translation table includes a plurality of translations, such as for example, a translation which maps memory address (e.g., Address 0B) to the first 4 KB block of memory, identified by block identifier MBlk1 (shown in FIG. 4A) and a translation which maps memory address (e.g., Address 1 MB) to the second 4 KB block of memory, identified by block identifier MBlk2 (also shown in FIG. 4A).

In some cases, the determination of whether to use the direct mapping mode includes determining whether the amount of memory requested to be allocated is less than a capacity (e.g., size) of the cache 402 or less than a predetermined portion (e.g., ratio, percentage) of the capacity of the cache 402. For example, direct mapping is used when the requested amount of memory (e.g., 4 KB) is less than a capacity (e.g., 1 MB) of the cache 402 or the requested amount of memory is less than a predetermined portion (e.g., 25%) of the cache 402. Otherwise, the portion of memory is allocated to the cache 402 using associative mapping, at block 306.

At block 310, a portion of the cache (e.g., a number of indices) is reserved for the portion (e.g., 4K block) of the memory, identified by block identifier MBlk1 and mapped to Address 0B. For example, cache indices 64-127 of cache 402 are reserved for the block of memory MBlk1 mapped to the Address 0B, as shown at FIG. 4A.

As shown at block 312, the method 300 includes assigning the reserved portion of the cache (e.g., reserved indices) to the identified portion of memory (e.g., for caching the data corresponding to the identified portion of memory). For example, at a first cycle shown at the first column of FIG. 4B, reserved indices 64-127 of the cache 402 are assigned to MBlk1, instead of assigning indices 0-63 of the cache 402 for MBlk1, which would occur according to the associative mapping policy.

FIG. 5 is a flow diagram illustrating an example method 500 of directly mapping identified portions of memory to a cache 402 according to features of the present disclosure. In the example method 500 described in FIG. 5, an 8 KB portion of memory is requested and segmented into two separate 4 KB blocks of memory.

As shown at block 502, the method 500 includes receiving a request to allocate a portion of memory to store data and for continuous residency (i.e., not be evicted) of the data in the cache 402, for a period of time, for a number of cycles or until an occurrence of an event. For example, a request is received, from the display client, to allocate an 8 KB block of memory and a request for continuous cache residency. The 8 KB block of memory maps to two non-contiguous 4 KB blocks of physical memory in which the physical memory addresses of each 4 KB blocks aliases to the same indices of the physically tagged associative cache 402.

Because the request includes a request for continuous cache residency, the cache is dynamically controlled to directly map the two segmented 4 KB blocks (mapped to non-contiguous physical memory addresses) to two different contiguous cache portions (e.g., sets of cache indices), as described below with regard to blocks 504 to 510. In some cases, the determination to directly map the two non-contiguous 4 KB blocks to two different contiguous sets of cache indices includes a determination of whether the amount of the portion of memory requested is less than a capacity (e.g., size) of the cache 402. For example, it is determined to directly map the two non-contiguous 4 KB blocks to two different contiguous sets of cache indices because the 8 KB portion of memory is less than the 1 MB cache size.

When a number of indices is requested for an identified segmented portion of memory (e.g., 4 K block of memory), the number of indices is reserved in the cache and assigned to the identified segmented portion of memory, which prevents associative allocations to the reserved indices. For example, as shown at block 504, the method 500 includes identifying the first segmented portion of memory using an identifier (e.g., MBlk1) which is mapped to the address for the first segmented portion of memory. The display client accesses mapping translation information (e.g., a translation table) which maps the physical memory addresses to blocks of memory each identified by a block identifier. The translation table includes a plurality of translations, such as for example, a translation which maps memory address (e.g., Address 0B) to the first 4 KB block of memory, identified by block identifier MBlk1 (shown in FIG. 4A). Accordingly, at a cycle, the first 4 K block of memory is identified (e.g., by a memory controller/processor) as MBlk1, which is mapped to Address 0B.

As shown at block 506, the method 500 includes reserving a contiguous portion of cache (e.g., reserved number of indices) for the identified first segmented portion of memory (e.g., MBlk1). For example, the contiguous set of cache indices 64-127 of cache 402 are reserved for MBlk1, which is mapped to Address 0B (as shown at FIG. 4A).

As shown at block 508, the method 500 includes assigning the reserved contiguous cache portion (e.g., reserved number of indices) to the identified second portion of memory (e.g., MBlk1). For example, at a first cycle shown at the first column of FIG. 4B, reserved indices 64-127 of the cache 402 are assigned to MBlk1 (e.g., for caching the data corresponding to MBlk1), instead of assigning indices 0-63 of the cache 402 for MBlk1, which would otherwise occur according to the associative mapping policy.

As shown at block 510, the second segmented portion of memory (e.g., second 4 K block of memory) is identified using an identifier (e.g., MBlk2) which is mapped to the address for the second segmented portion of the requested portion of memory. The display client accesses the mapping translation information (e.g., the translation table) which includes a translation that maps memory address (e.g., Address 1 MB) to the second 4 KB block of memory, identified by block identifier MBlk2 (shown in FIG. 4A).

As shown at block 512, the method 500 includes reserving a contiguous portion of cache (e.g., reserved number of indices) for the second identified second segmented portion of memory (e.g., MBlk2). For example, the contiguous set of cache indices 0-63 of cache 402 are reserved for MBlk2, which is mapped to Address 1 MB (shown at FIG. 4A).

As shown at block 514, the method 500 includes assigning the reserved contiguous cache portion (e.g., reserved number of indices) to the identified second portion of memory (e.g., MBlk2). For example, at a second cycle shown at the second column of FIG. 4B, reserved indices 0-63 of the cache 402 are assigned to MBlk2 (e.g., for caching the data corresponding to MBlk2). Accordingly, the non-contiguous physical memory addresses (Address 0B and Address 1 MB) will not alias to same cache indices and the data for both non-contiguous blocks MBlk1 and MBlk2 will not be evicted for the duration of the requested cache residency.

While a portion (e.g., 25%) of the cache is allocated for direct mapping mode (e.g., in response to receiving a request for continuous cache residency), segmented portions of the cache are not reserved and associative allocations are not prevented until there is a request to reserve a segmented portion of the cache (e.g., contiguous set of cache indices) for an identified block of memory. For example, the contiguous set of cache indices 64-127 are not reserved until the first block of memory is identified via block identifier MBlk1 and the contiguous set of cache indices 0-63 are not reserved until the second block of memory is identified via block identifier MBlk2. At times, any amount of the allocated portion can be used to satisfy the continuous cache residency. Accordingly, when a smaller amount of the allocated portion (e.g., less than 25%) of the cache is used, more of the cache is available to clients requesting associative accesses, reducing performance penalties.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, memory controller/processor 208, and the cache controller/processors 210, 218 and 220 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of controlling a cache comprising;
receiving a first request from a first client to allocate a first portion of memory to store first data;
receiving a second request, from a second client, to allocate a second portion of memory to store second data;
when at least one of the first request to allocate the first portion of memory to store the first data and the second request to allocate the second portion of memory to store the second data includes a cache residency request that the first data or the second data continuously resides in cache memory, directly mapping at least one of the first portion of memory to a first assigned contiguous portion of the cache memory and the second portion of memory to a second assigned contiguous portion of the cache memory; and
when the at least one of the first and second request does not include a cache residency request that the first data or the second data continuously resides in the cache memory, mapping the first portion of memory to the cache memory using associative mapping,
wherein first virtual to physical translation information used by the first client and second virtual to physical translation information used by the second client are different.

2. The method of claim 1, further comprising determining whether the request to allocate the portion of memory includes the cache residency request.

3. The method of claim 1, further comprising:
identifying the portion of memory by an identifier which is mapped to a memory address; and
reserving the portion of the cache memory for the identified portion of memory that is identified by the identifier mapped to the memory address.

4. The method of claim 1, wherein the assigned contiguous portion of the cache memory comprises a contiguous number of cache indices.

5. The method of claim 4, wherein a number of ways is assigned for each cache index.

6. The method of claim 1, wherein the cache residency request, that the data continuously resides in the portion of cache memory, is a request that the data not be evicted from the portion of cache memory for a period of time, for a number of cycles, or until an occurrence of an event.

7. The method of claim 1, wherein the portion of cache memory is a physically tagged portion of cache memory.

8. A method of controlling a cache comprising;
receiving a request to allocate a portion of memory to store data and for continuous residency of the data in cache memory;
identifying a first segment of the portion of memory using first virtual to physical translation information, including a first identifier mapped to a first memory address;
assigning a first contiguous portion of the cache memory, reserved for the first segment, to the first segmented portion of memory;
identifying a second segment of the portion of memory using second virtual to physical translation information different from the first virtual to physical translation information, including a second identifier mapped to a second memory address that is non-contiguous with the first memory address; and assigning a second contiguous portion of the cache memory, reserved for the second segment, to the second segmented portion of memory.

9. The method of claim 8, wherein the assigned contiguous portion of the cache memory comprises a contiguous number of cache indices.

10. The method of claim 8, wherein a number of ways is assigned for each cache index.

11. The method of claim 8, wherein the request for continuous cache residency is a request that the data not be evicted from the portion of cache memory for a period of time, for a number of cycles, or until an occurrence of an event.

12. The method of claim 8, wherein the cache is a physically tagged cache.

13. A processing device comprising:
   memory;
   cache memory, separate from the memory;
   a processor configured to:
   receive a first request from a first client to allocate a first portion of the memory to store first data;
   receive a second request, from a second client, to allocate a second portion of memory to store second data;
   when at least one of the first request to allocate the first portion of the memory to store the first data and the second request to allocate the second portion of memory to store the second data includes a cache residency request that the first data or the second data continuously resides in cache memory, directly map at least one of the first portion of memory to a first assigned contiguous portion of the cache memory and the second portion of memory to a second assigned contiguous portion of the cache memory; and
   when the at least one of the first and second request does not include a cache residency request that the first data or the second data continuously resides in the cache memory, map the first portion of memory to the cache memory using associative mapping,
   wherein first virtual to physical translation information used by the first client and second virtual to physical translation information used by the second client are different.

14. The processing device of claim 13, wherein the processor is configured to determine whether the request to allocate the portion of memory includes the cache residency request.

15. The processing device of claim 13, wherein the processor is configured to:
   identify the portion of memory by an identifier which is mapped to a memory address; and
   reserve the portion of the cache memory for the identified portion of memory identified by the identifier mapped to the memory address.

16. The processing device of claim 13, wherein the assigned contiguous portion of the cache memory comprises a contiguous number of cache indices.

17. The processing device of claim 13, wherein a number of ways is assigned for each cache index.

18. The processing device of claim 13, wherein the cache residency request, that the data continuously resides in the portion of cache memory, is a request that the data not be evicted from the portion of cache memory for a period of time, for a number of cycles, or until an occurrence of an event.

19. The processing device of claim 13, wherein the portion of cache memory is a physically tagged portion of cache memory.

* * * * *